United States Patent [19]
Itoh

[11] Patent Number: 5,201,001
[45] Date of Patent: Apr. 6, 1993

[54] PILOT SIGNAL CANCELLING SYSTEM

[75] Inventor: Masashi Itoh, Yokohama, Japan

[73] Assignee: Kabushiki Kaisha Toshiba, Kawasaki, Japan

[21] Appl. No.: 827,100

[22] Filed: Jan. 30, 1992

[30] Foreign Application Priority Data

Jan. 30, 1991 [JP] Japan .................. 3-010111

[51] Int. Cl.$^5$ ................................ H04H 5/00
[52] U.S. Cl. .............................. 381/13; 381/12
[58] Field of Search ................... 381/4, 7, 13, 12

[56] References Cited

U.S. PATENT DOCUMENTS

| | | | |
|---|---|---|---|
| 4,306,112 | 12/1981 | Ueno | 381/13 |
| 4,314,377 | 2/1982 | Kondo et al. | 381/13 |
| 4,419,541 | 12/1983 | Kishi et al. | 381/13 |
| 4,669,119 | 5/1987 | Jansen et al. | 381/13 |
| 4,751,735 | 6/1988 | Kagawa et al. | 381/13 |
| 4,932,058 | 6/1990 | Marrah et al. | 381/13 |

Primary Examiner—Forester W. Isen
Attorney, Agent, or Firm—Foley & Lardner

[57] ABSTRACT

Disclosed is a pilot signal cancelling system employed in an FM stereo receiver which does not cause deterioration of the S-N ratio. The system includes an input terminal for inputting a composite signal; a level detector for verifying the level of a pilot signal; a low pass filter for smoothing an output of the level detector; a cancelling wave generating circuit fo producing a pilot cancelling signal in response to an output of the low pass filter; a lamp trigger circuit for inputting the output of the low pass filter and outputting a lamp trigger signal; a lamp drive circuit for inputting the lamp trigger signal; a first computing circuit, connected to the level detector, for differentiating between the pilot signal in the composite signal and the pilot cancelling signal produced in the cancelling wave generating circuit; a second computing circuit, connected to an output terminal, for differentiating between the composite signal and the pilot cancelling signal; the output terminal for outputting the result of second computing circuit; and a switching circuit for switching on and off the connection of the pilot cancelling signal to the second computing circuit, by synchronizing the switching with the lamp trigger signal.

6 Claims, 8 Drawing Sheets

PILOT SIGNAL CANCELLING SYSTEM

BACKGROUND OF THE INVENTION

1. Field of the Invention

The present invention relates to a pilot signal cancelling system that eliminates pilot signals mixed in composite signals in a stereo modulation. More specifically, this invention relates to the pilot signal cancelling system in which the signal-to-noise ratio does not deteriorate.

1. Description of the Prior Art

Figure 1:
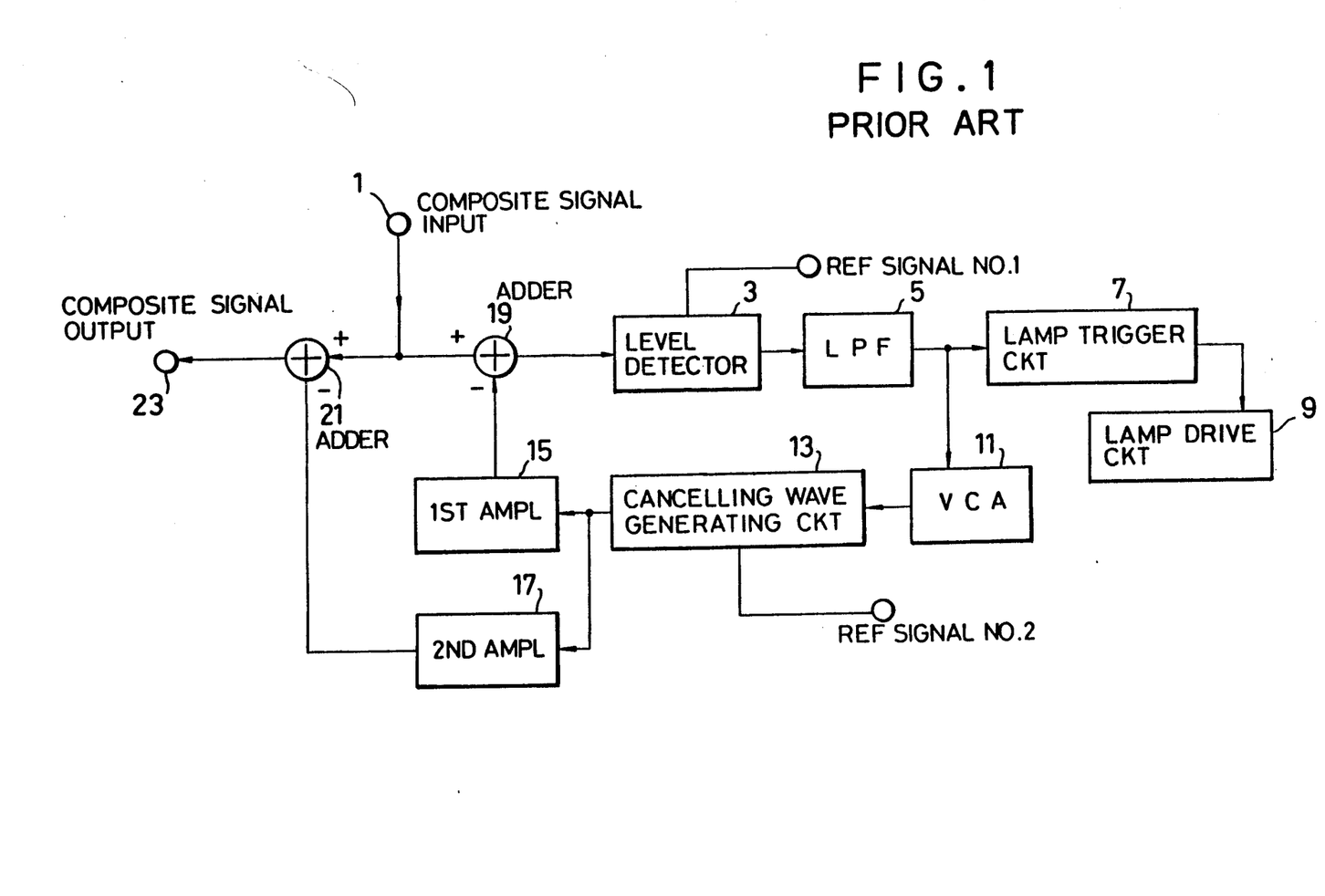
FIG. 1 shows a block diagram of a conventional pilot cancelling system.

FIG. 1 shows the configuration of a conventional pilot signal cancelling system. Referring to FIG. 1, the pilot signal cancelling system has the following functions and construction.

First, a composite signal is inputted from an input terminal 1. Next, a pilot signal of 19 kHz is level-detected by a level detector 3. Then, a lamp drive circuit 9 is activated by a lamp trigger circuit 7 with a voltage smoothed by a low-pass filter (LPF) 5. An output of LPF 5 flows through a voltage control amplifier (VCA) 11 and a cancelling wave generating circuit 13 to generate a pilot cancelling wave. The pilot cancelling wave is amplified by a first amplifier pilot cancelling wave is subtracted from the pilot signal in the composite signal by an adder 19, then inputted into the level detector 3. In other words, a negative feedback loop is constituted by the output of LPF 5, VCA 11, cancelling wave generating circuit 13 and first amplifier 15, in this order. Accordingly, as an output of the cancelling wave generating circuit 13 there is generated a cancelling wave proportional to the pilot signal level in the composite signal. Furthermore, the output of cancelling wave generating circuit 13 is amplified by a second amplifier 17. The amplified output of cancelling wave generating circuit 13 is subtracted from the original pilot signal by the adder 21. As a result, a signal in which the pilot signal has been cancelled is obtained in a composite signal output terminal 23.

Since the output of cancelling wave generating circuit 13 is proportional to the original pilot signal level in the composite signal, a signal (without pilot signal) in response to the original pilot signal is obtained in a composite signal output terminal 23.

The VCA 11 is driven by the output of LPF 5. Thus, a leak current from LPF 5 causes the VCA 11 and the cancelling wave generating circuit 13 to generate a slight amount of cancelling wave even in a monaural mode in a conventional system. This is a malfunction of the system since the monaural signals, do not contain any pilot signals thus, requiring no activation of the cancelling wave generating circuit 13. Such an unnecessary cancelling wave is outputted to the output terminal 23 through the second amplifier 17 and an adder 21. Consequently, an S-N ratio is deteriorated by the cancelling wave in a monaural mode. In particular, it creates a problem when the leak current increases with a high temperature.

Even when the positive signal state of (a pilot signal) is abruptly changed to the no pilot signal stated in stereo broadcasting, the cancelling wave is outputted, causing the S-N ratio to deteriorate. This is because a voltage which drives VCA 11 is still ON until the VCA driving voltage reaches to OFF level, due to a time constant of LPF 5 even though the lamp trigger circuit 7 is off.

The above problem becomes more serious when the composite signals are switched at high speed. For example, when another station is searched intermittently at high speed while listening to a station program, the cancelling wave alone is outputted without the presence of any original pilot signal during the search, thus deteriorating the S-N ratio. This problem is best illustrated with reference to the following figures.

Figure 2:
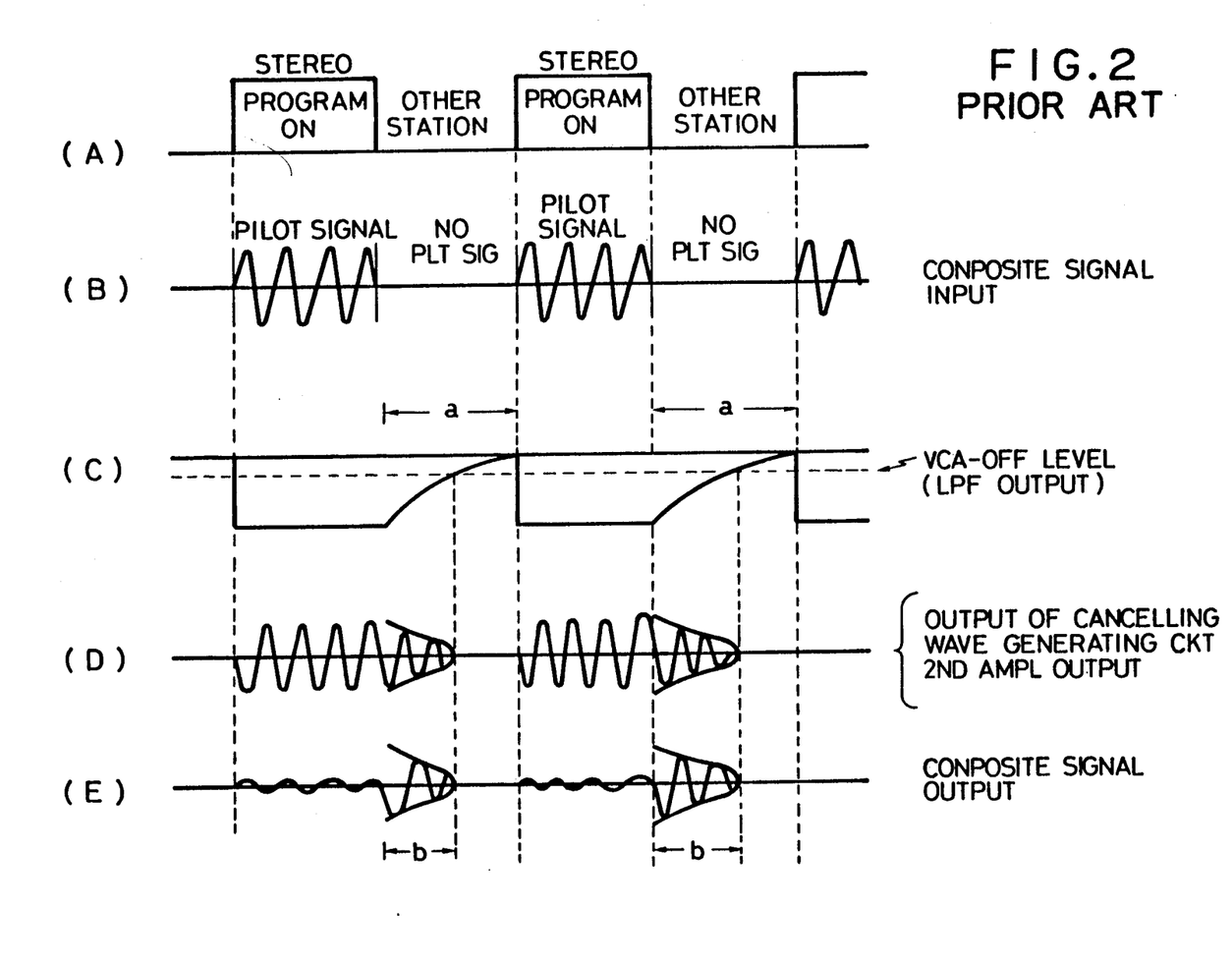
FIG. 2 shows input-output wave forms of each portion for the pilot cancelling system shown in FIG. 1.

FIG. 2 shows an input/output wave form of the pilot cancelling system when a stereo program (having a pilot signal) is repeatedly switched over to the other station's programs (no pilot signal), and vice versa. FIG. 2B shows a pilot signal wave form in the composite signal at the input terminal 1. FIG. 2C shows an output wave form of LPF 5. FIG. 2D shows an output wave form of cancelling wave generating circuit 13 and second amplifier 17. FIG. 2E shows a signal, in which the pilot signal has been cancelled, at the output terminal 23.

When the state of the pilot signal is switched from having a pilot signal to no pilot signal, the output of LPF 5 decreases gradually with the time constant and is discharged for the duration of —a—indicated in FIG. 2C. The cancelling wave generating circuit 13 and the second amplifier are still outputting the cancelling wave form for the duration of —b—(shown in FIG. 2E) until the voltage reaches to the OFF level as shown in FIG. 2C. Therefore, the composite signal at output terminal 23, which is the difference between the pilot waves shown in FIG. 2B and FIG. 2D is shown in FIG. 2E. FIG. 2E shows that even if there is no pilot signal in range b, the cancelling wave is outputted, causing the S-N ratio to deteriorate.

As shown above, there are shortcomings in the conventional pilot cancelling system. Namely, the S-N ratio is deteriorated due to the leak current in the monaural broadcasting and the time constant of low pass filter 5 at the time of switching the pilot signal on and off.

SUMMARY OF THE INVENTION

The present invention was made in view of the above-mentioned problems. Therefore, it is an object thereof to provide a pilot signal cancelling system without causing deterioration of the S-N ratio when receiving a monaural signal or searching for other stations intermittently at high speed while listening to a station.

To achieve the object, there is provided a pilot cancelling system, comprising: an input terminal for inputting a composite signal; a level detector for verifying the level of a pilot signal in the composite signal by comparing it to a pilot signal cancelling wave produced by a cancelling wave generating circuit by which a negative feedback loop is constituted; a low pass filter for smoothing an output of the level detector; a cancelling wave generating circuit for producing a pilot signal cancelling wave in response to an output of the low pass filter; a lamp trigger circuit for inputting another output of the low pass filter and outputting a lamp trigger signal; a lamp drive circuit for inputting the lamp trigger signal so that a stereo state is indicated; first computing means, operated in the negative feedback loop, for differentiating between the pilot signal in the composite signal and a pilot signal cancelling wave produced in the cancelling wave generating circuit; second computing means for differentiating between the composite signal and a pilot signal cancelling wave produced in the cancelling wave generating circuit; an output terminal for outputting the result of second computing means; and switching means, connected to the cancelling wave generating circuit and the second computing means, for switching on and off the connection of the cancelling wave to the second computing means, by synchronizing with the lamp trigger signal from the lamp trigger circuit.

Other features and advantages of the present invention will become apparent from the following description taken in conjunction with the accompanying drawings.

DETAILED DESCRIPTION OF THE PREFERRED EMBODIMENTS

Figure 3:
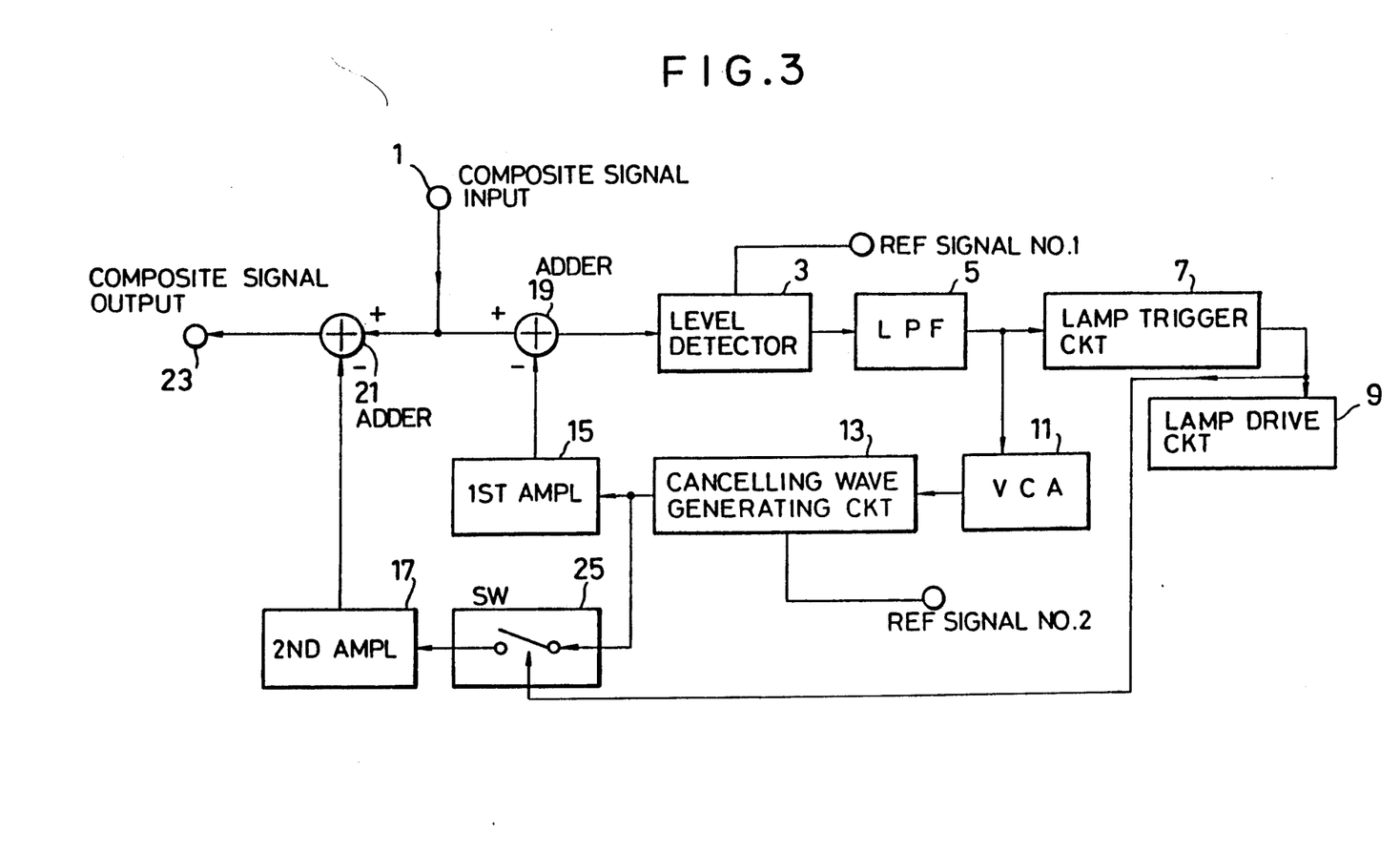
FIG. 3 shows a block diagram of the pilot cancelling system according to the first embodiment of the present invention.

Referring to FIG. 3, one embodiment of a pilot signal cancelling system according to the first embodiment of the present invention will be described in terms of the circuitry.

A switch 25 is provided between an output of cancelling wave generating circuit 13 and a second amplifier. The switch 25 is so controlled that on-off switching of the switch 25 is synchronous with the output of lamp trigger circuit 7. In other words, when the lamp trigger circuit 7 is on, the switch 25 is on, and when the lamp trigger circuit 7 is off, the switch 25 is off.

When the switch 25 is implemented in that manner, the pilot signal cancelling system of the present invention operates as follows.

First, when a composite signal having a pilot signal (stereo mode) is inputted from an input terminal 1, the pilot signal of 19 kHz is level-detected by a level detector 3. Then, a lamp drive circuit 9 is activated by a lamp trigger circuit 7 with a voltage smoothed by a low-pass filter (LPF) 5. Since the state of lamp trigger circuit is ON at this stage, the switch 25 is closed (ON). An output of LPF 5 flows through a voltage control amplifier (VCA) 11, and a cancelling wave generating circuit 13 thereby generates a pilot cancelling wave. As an output of the cancelling wave generating circuit 13, there is generated a cancelling wave proportional to the pilot signal level in the composite signal. Since the switch 25 is closed (ON), the output of cancelling wave generating circuit 13 is amplified by a second amplifier. The amplified pilot cancelling wave is subtracted from the original pilot signal in the composite signal by an adder 21. As a result, a signal in which the pilot signal has been cancelled is obtained in a composite signal output terminal 23.

Next, when the composite signal is changed to the state of containing no pilot signal (monaural mode) and the output of LPF 5 is decreased enough to reach the OFF lamp level, the lamp trigger circuit 7 becomes OFF. Synchronized with the OFF state of lamp trigger circuit 7, the switch becomes open (OFF) and in the composite signal output terminal 23 there appears a signal without a pilot cancelling wave. In other words, if the incoming signal is a monaural one without a pilot signal, the cancelling wave generated as noise due to the time constant can be avoided by not sending such unwanted cancelling wave to the output terminal 23.

Figure 4:
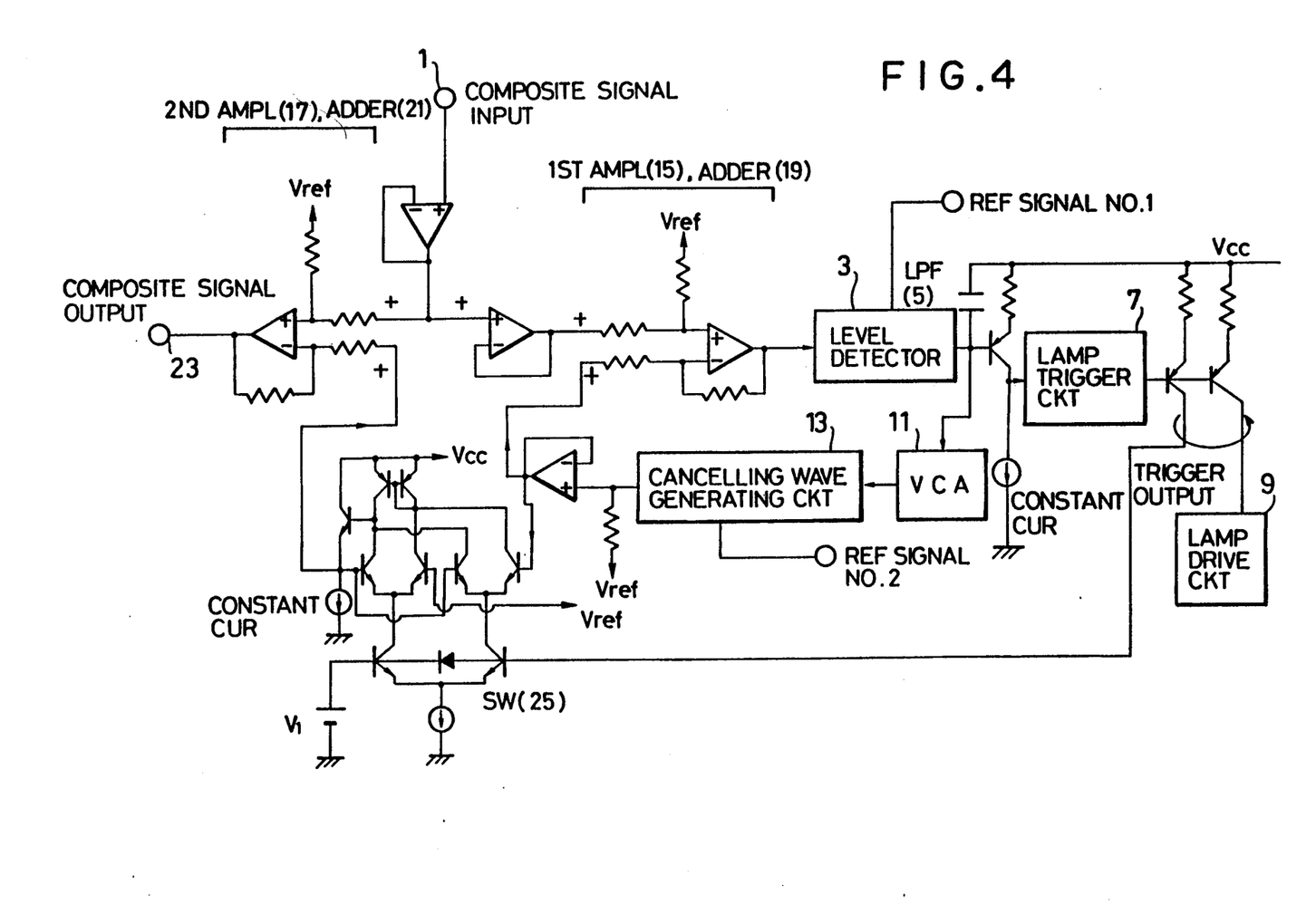
FIG. 4 shows a schematic diagram for the pilot cancelling system shown in FIG. 3.

FIG. 4 shows a circuit diagram for the pilot signal cancelling system of the first embodiment in the present invention.

Figure 5:
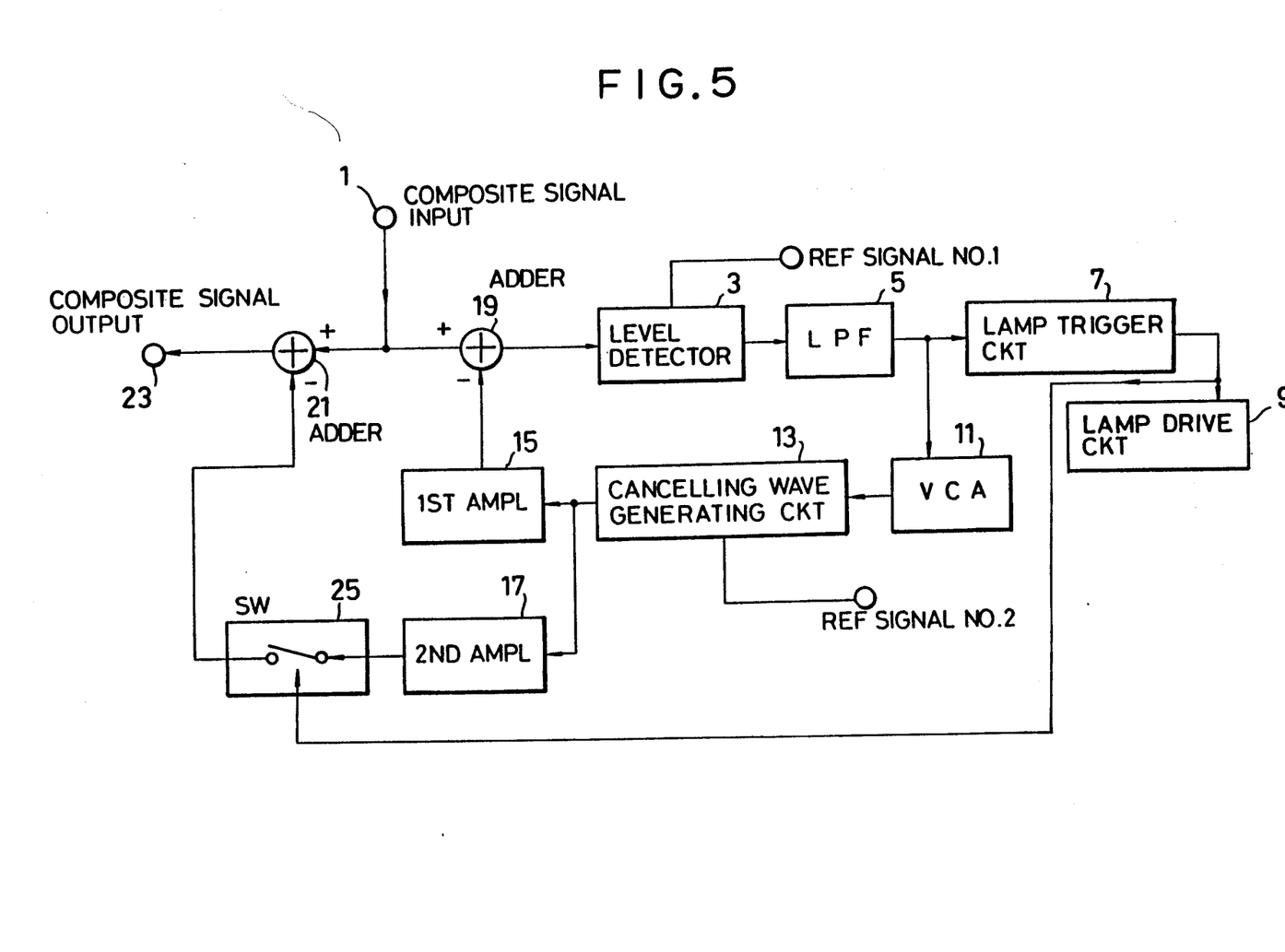
FIG. 5 shows a block diagram of the pilot cancelling system according to the second embodiment of the present invention, where the locations of second amplifier 17 and switch 25 are interchanged, as compared to the first embodiment shown in FIG. 3.

FIG. 5 is a block diagram of the pilot signal cancelling system according to the second embodiment of the present invention.

In the pilot signal cancelling system according to the second embodiment, the locations of second amplifier 17 and switch 25 are interchanged, as compared to the first embodiment shown in FIG. 3.

Figure 6:
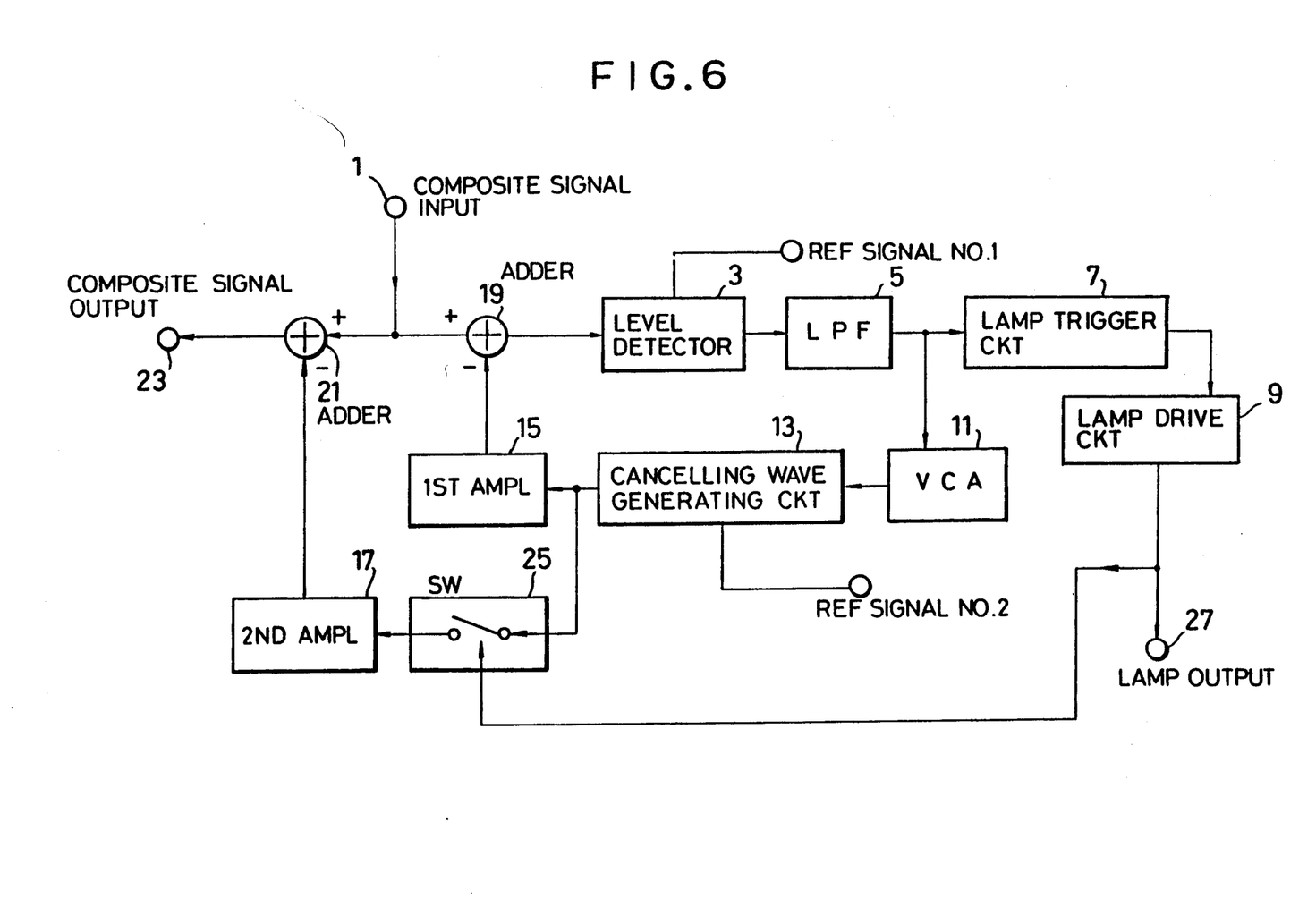
FIG. 6 shows a block diagram of the pilot cancelling system according to the third embodiment of the present invention, where the switch 25 is controlled by the output of lamp drive circuit 9, as compared to the first embodiment shown in FIG. 3.

FIG. 6 shows a block diagram of the pilot signal cancelling system according to the third embodiment.

In the pilot signal cancelling system according to the third embodiment, the switch 25 is controlled by the output of lamp drive circuit 9, as compared to the first embodiment shown in FIG. 3.

Figure 7:
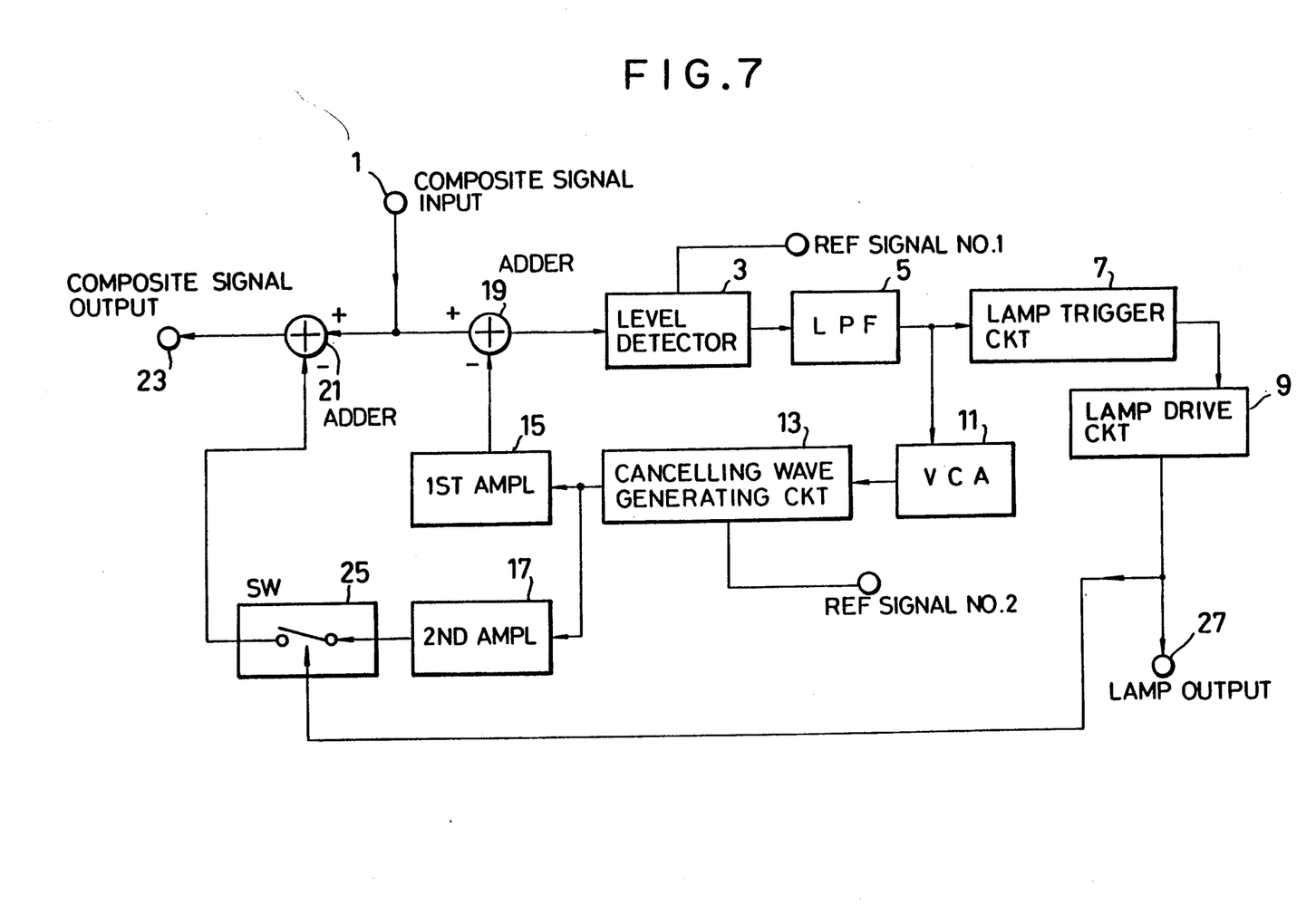
FIG. 7 shows a block diagram of the pilot cancelling system according to the fourth embodiment of the present invention, where the locations of second amplifier 17 and switch 25 are interchanged, as compared to the third embodiment shown in FIG. 6.

FIG. 7 is a block diagram of the pilot signal cancelling system according to the fourth embodiment.

In the pilot signal cancelling system according to the fourth embodiment, the locations of second amplifier 17 and switch 25 are interchanged, as compared to the third embodiment shown in FIG. 6.

Figure 8:
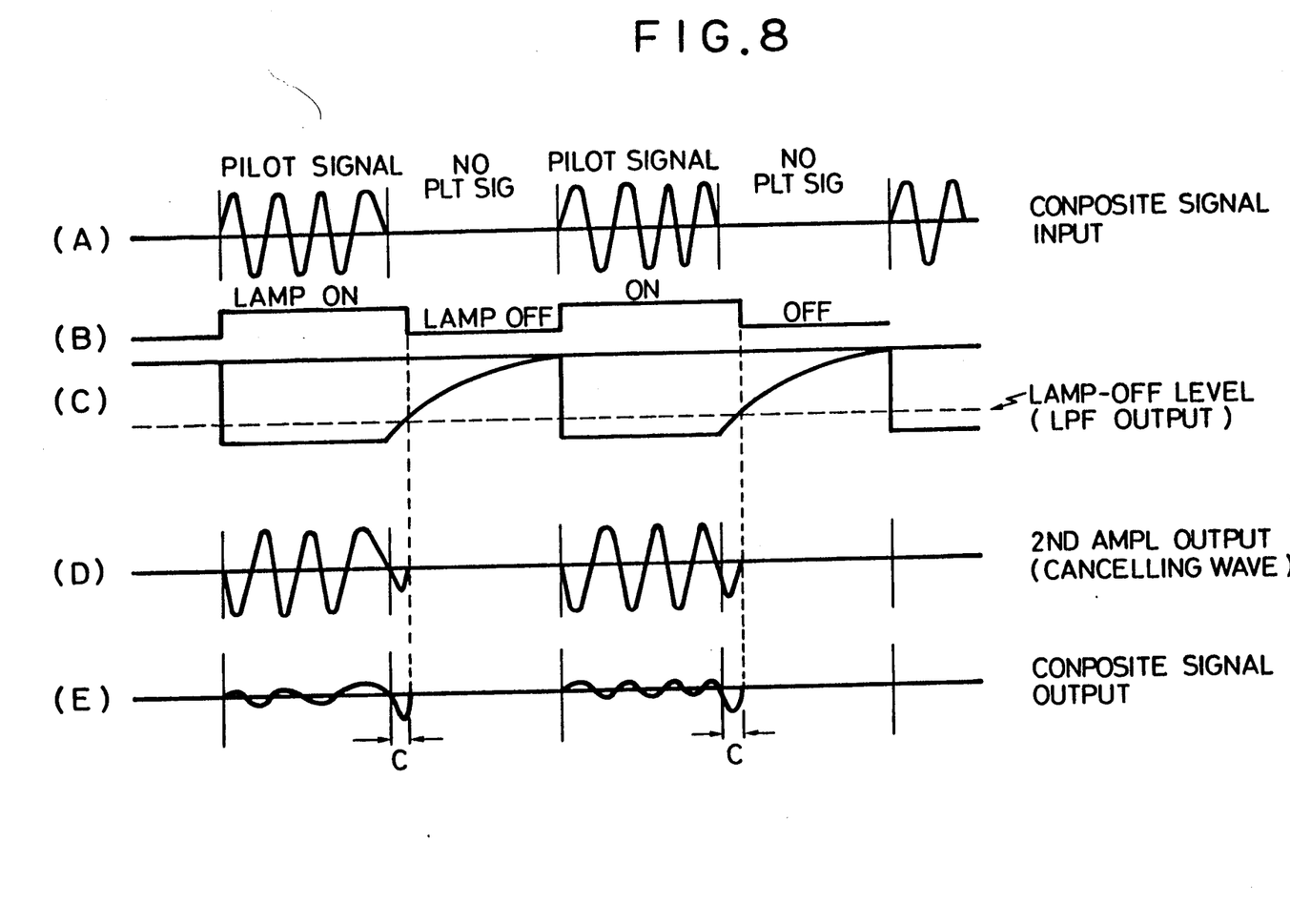
FIG. 8 shows input-output wave forms of each portion of the pilot cancelling system shown in FIG. 3.

Referring to FIG. 8 which employs the first embodiment of the present invention, it is explained how an improvement overcomes the problem of deterioration of the S-N ratio when switching the composite signal (from the state of having pilot signal to no pilot signal), for example, when intermittently searching other radio stations at high speed while listening to a station.

FIG. 8 shows an input/output wave form for each portion of the pilot signal cancelling system according to the first embodiment when a stereo mode (having a pilot signal) is repeatedly switched over to other stations (no pilot signal), and vice versa. FIG. 8A shows a pilot signal wave form of composite signal input 1. FIG. 8B shows an ON and OFF state of lamp trigger circuit 7. FIG. 8C shows an output wave form of LPF 11. FIG. 8D shows an cancelling wave form of second amplifier 17. FIG. 8E shows the signal wave form in which the pilot signal has been cancelled at the output terminal 23.

When the state of the pilot signal is switched from having a pilot signal to no pilot signal, the output of LPF 5 decreases gradually with the time constant as shown in FIG. 8C. At this time, the second amplifier outputs the cancelling wave. When the wave form of FIG. 8D is subtracted from that of FIG. 8A to obtain the signal in which the pilot signal has been cancelled at the output terminal 23, a cancelling wave is left in the form of a noise. However, the level of the noise is comparatively negligible for the noise is inaudible to human ears. Accordingly, the present invention makes a significant improvement in solving the problem of S-N ratio deterioration.

In summary, there is provided the switch 25, connected to the output or input of second amplifier 17, for switching on and off in synchronization with the output of lamp trigger circuit 7 or lamp drive circuit 9, namely, with the ON and OFF command from the lamp trigger circuit 7 or lamp drive circuit 9. When such switch 25 is implemented in that manner, even if a leak current occurs at an output terminal of LPF 5, the leakage will be absorbed in the lamp trigger circuit 7 since the lamp trigger circuit 7 usually holds a threshold level, thus generating few unwanted cancelling waves. Therefore, the present invention offers a pilot signal cancelling system with practically no S-N ratio deterioration.

Furthermore, since the pilot cancelling wave is outputted to the output side in synchronism with the lamp ON and OFF, S-N ratio deterioration is greatly suppressed, for example, when other stations are being searched while listening to a station's program.

Besides those already mentioned above, many modifications and variations of the above embodiments may be made without departing from the novel and advantageous features of the present invention. Accordingly, all such modifications and variations are intended to be included within the scope of the appended claims.

What is claimed is

1. A pilot signal cancelling system for an FM stereo receiver, comprising:
    an input terminal for inputting a composite signal;
    a level detector, connected to the input terminal, for verifying the level of a signal derived by comparing the pilot signal in the composite signal to a pilot cancelling signal produced by a cancelling wave generating circuit for cancelling the pilot signal;
    a low pass filter, connected to the level detector, for smoothing an output of the level detector;
    a pilot cancelling wave generating circuit for producing the pilot cancelling signal in response to an output of the low pass filter;
    a lamp trigger circuit, connected to the low pass filter, for inputting the output of the low pass filter and for outputting a lamp trigger signal;
    a lamp drive circuit for inputting the lamp trigger signal so as to indicate a stereo state;
    first computing means, connected to the cancelling wave generating circuit and the level detector, for taking the difference between the pilot signal in the composite signal and the pilot cancelling signal produced in the cancelling wave generating circuit;
    second computing means, connected to the cancelling wave generating circuit and an output terminal, for taking the difference between the composite signal and the pilot cancelling signal produced in the cancelling wave generating circuit;
    an output terminal for outputting the result of the second computing means; and
    switching means, connected to the cancelling wave generating circuit and the second computing means, for switching on and off the connection of the pilot cancelling signal to the second computing means, by synchronizing the switching with the lamp trigger signal from the lamp trigger circuit.

2. A pilot signal cancelling system as recited in claim 1, further comprising:
    a voltage control amplifier connecting the low pass filter and the cancelling wave generating circuit;
    a first amplifier connecting the cancelling wave generating circuit and the first computing means; and
    a second amplifier connecting the switching means and the second computing means.

3. A pilot signal cancelling system as recited in claim 2, wherein the second amplifier is connected to the switching means and the cancelling wave generating circuit.

4. A pilot signal cancelling system for an FM stereo receiver, comprising:
    an input terminal for inputting a composite signal;
    a level detector, connected to the input terminal, for verifying the level of a signal derived by comparing the pilot signal in the composite signal to a pilot cancelling signal produced by a cancelling wave generating circuit for cancelling the pilot signal;
    a low pass filter, connected to the level detector, for smoothing an output of the level detector;
    a pilot cancelling wave generating circuit for producing the pilot cancelling signal in response to an output of the low pass filter;
    a lamp trigger circuit, connected to the low pass filter, for inputting the output of the low pass filter and for outputting a lamp trigger signal;
    a lamp drive circuit for inputting the lamp trigger signal so as to indicate a stereo state;
    first computing means, connected to the cancelling wave generating circuit and the level detector, for taking the difference between the pilot signal in the composite signal and the pilot cancelling signal produced in the cancelling wave generating circuit;
    second computing means, connected to the cancelling wave generating circuit and an output terminal, for taking the difference between the composite signal and the pilot cancelling signal produced in the cancelling wave generating circuit;
    an output terminal for outputting the result of the second computing means; and
    switching means, connected to the cancelling wave generating circuit and the second computing means, for switching on and off the connection of the pilot cancelling signal to the second computing means, by synchronizing the switching with the lamp drive circuit.

5. A pilot signal cancelling system as recited in claim 4, further comprising:
    a voltage control amplifier connecting the low pass filter and the cancelling wave generating circuit;
    a first amplifier connecting the cancelling wave generating circuit and the first computing means; and
    a second amplifier connecting the switching means and the second computing means.

6. A pilot signal cancelling system as recited in claim 5, wherein the second amplifier is connected to the switching means and the cancelling wave generating circuit.

* * * * *